United States Patent
Inatani

(10) Patent No.: US 11,684,983 B2
(45) Date of Patent: Jun. 27, 2023

(54) METHOD FOR PRODUCING VEHICLE WHEELS

(71) Applicant: RAYS ENGINEERING CO., LTD., Osaka (JP)

(72) Inventor: Shujiro Inatani, Osaka (JP)

(73) Assignee: RAYS ENGINEERING CO., LTD., Osaka (JP)

(*) Notice: Subject to any disclaimer, the term of this patent is extended or adjusted under 35 U.S.C. 154(b) by 811 days.

(21) Appl. No.: 16/703,903

(22) Filed: Dec. 5, 2019

(65) Prior Publication Data
US 2021/0023608 A1 Jan. 28, 2021

(30) Foreign Application Priority Data
Jul. 24, 2019 (JP) .............................. JP2019-135962

(51) Int. Cl.
*B23D 5/00* (2006.01)
*B60B 3/06* (2006.01)

(52) U.S. Cl.
CPC .......... *B23D 5/00* (2013.01); *B60B 2310/226* (2013.01); *B60B 2310/616* (2013.01);
(Continued)

(58) Field of Classification Search
CPC ............ B23D 5/00; B23D 1/00–13/06; Y10T 29/49481–29/49542;
(Continued)

(56) References Cited

U.S. PATENT DOCUMENTS

| 5,491,030 A | 2/1996 | Asai et al. |
| 5,706,567 A | 1/1998 | Sakagami et al. |

(Continued)

FOREIGN PATENT DOCUMENTS

| CA | 2356945 A1 * | 8/2000 |
| EP | 1162018 A1 * | 12/2001 |

(Continued)

OTHER PUBLICATIONS

Machine Translation of RU 2446916 C1, which RU '916 was published Apr. 2012.*

(Continued)

*Primary Examiner* — Erica E Cadugan
(74) *Attorney, Agent, or Firm* — Amin, Turocy & Watson, LLP

(57) ABSTRACT

The step being performed in a state where a wheel body is fixed to be prevented from rotating around a rotation axis while a cutting edge of a cutting tool is in contact with the three-dimensional shape surface of the design surface in the wheel body, the cutting tool being three-dimensionally and continuously moved relatively along the three-dimensional shape surface while being changed in direction with respect to the three-dimensional shape surface to allow a rake face of the cutting tool to face a tool travel direction to perform three-dimensional continuous cutting processing that allows a specular glossy surface to be automatically formed in the three-dimensional shape surface, the specular glossy surface being finished into a processed surface having a high metallic gloss property by exposing the base metal.

12 Claims, 7 Drawing Sheets

(52) U.S. Cl.
CPC ... *B60B 2310/651* (2013.01); *B60B 2310/652* (2013.01); *B60B 2310/656* (2013.01); *Y10T 29/49536* (2015.01); *Y10T 409/5041* (2015.01); *Y10T 409/50082* (2015.01); *Y10T 409/502624* (2015.01)

(58) Field of Classification Search
CPC .... Y10T 409/50–409/50984; B60B 2310/228; B60B 2310/226; B60B 2310/651; B60B 2310/652; B60B 2310/656
USPC ................... 409/288–348; 29/894–894.381
See application file for complete search history.

(56) References Cited

U.S. PATENT DOCUMENTS

| | | | | |
|---|---|---|---|---|
| 5,765,976 | A | * | 6/1998 | Ozaki ..................... B23D 5/00 409/289 |
| 5,792,334 | A | | 8/1998 | Asai et al. |
| 2002/0101112 | A1 | * | 8/2002 | Gatton .................... B23B 5/02 301/65 |
| 2002/0125763 | A1 | * | 9/2002 | Stembridge .......... B60B 7/0046 301/37.31 |
| 2004/0187654 | A1 | * | 9/2004 | Kato ..................... B23Q 1/626 82/1.5 |
| 2005/0120557 | A1 | * | 6/2005 | Gatton .................. B23P 15/00 29/894.32 |
| 2012/0201623 | A1 | * | 8/2012 | Tingley, III ............ B23D 5/00 409/293 |
| 2020/0269374 | A1 | * | 8/2020 | Schoop ................... B23D 5/00 |
| 2021/0260916 | A1 | * | 8/2021 | Inatani .................... B60B 1/08 |

FOREIGN PATENT DOCUMENTS

| | | | | |
|---|---|---|---|---|
| EP | 2145708 | A2 | * | 1/2010 |
| EP | 3225335 | A1 | * | 10/2017 |
| GB | 2462297 | A | * | 2/2010 |
| JP | 59-114101 | A | * | 7/1984 |
| JP | 03-123603 | | | 5/1988 |
| JP | 01-115501 | A | * | 5/1989 |
| JP | 04-353001 | A | * | 12/1992 |
| JP | 06-000711 | A | * | 1/1994 |
| JP | 06-71552 | | | 3/1994 |
| JP | 06-335854 | | | 12/1994 |
| JP | 07-223126 | | | 8/1995 |
| JP | 07-276148 | | | 10/1995 |
| JP | 08-34201 | | | 2/1996 |
| JP | 2005-059200 | A | * | 3/2005 |
| JP | 2006-289513 | | | 10/2006 |
| JP | 2017-226330 | | | 12/2017 |
| RU | 2446034 | C1 | * | 3/2012 |
| RU | 2446916 | C1 | * | 4/2012 |
| WO | WO-2018/078454 | A1 | * | 5/2018 |

OTHER PUBLICATIONS

Machine Translation of JP 2005-059200 A, which JP '200 was published Mar. 2005.*

Machine Translation of EP 2145708 A2, which EP '708 was published Jan. 2010.*

Machine Translation of JP 04-353001-A, which JP '001 was published Dec. 1992.*

* cited by examiner

Processed surface formed with a double blade ball end mill

Processed surface formed by three-dimensional continuous cutting processing
(The present invention)

METHOD FOR PRODUCING VEHICLE WHEELS

BACKGROUND OF THE INVENTION

Field of the Invention

The present invention relates to a method for producing vehicle wheels, and more particularly to a method for forming a specular glossy surface like a mirror, having a high metallic gloss property of a base metal on a three-dimensional shape surface of a design surface.

Description of the Related Art

Conventionally, a vehicle wheel has a design surface formed with a bright surface in which a base metal is partially exposed to improve design properties.

For example, known examples of a method for forming the bright surface include a method in which a design surface is scraped with an end mill (rotary tool) to expose a base metal, and then buffing is performed to increase brilliancy (refer to Japanese Patent Application Laid-open No. 7-223126, Japanese Patent Application Laid-open No. 6-335854, Japanese Patent Application Laid-open No. 6-71552, and Japanese Patent Application Laid-open No. 7-276148). In addition, when buffing is performed, the number of manufacturing steps is increased to cause not only increase in manufacturing time and cost, but also dull gloss that is unique to buffing. To solve these problems, there is also proposed a method for cutting a design surface with a diamond cutting tool while a vehicle wheel is rotated using a lathe, the method eliminating the need for buffing (refer to Japanese Patent Application Laid-open No. 8-34201).

SUMMARY OF THE INVENTION

Unfortunately, cutting processing with a lathe enables a bright surface to be formed only on a specific one surface such as a top surface of a spoke or a rim flange on a design surface side, and buffing does not enable a surface to be finished with a high metallic gloss property like a mirror. That is, lathe processing is performed to cut a surface of a workpiece by pressing a blade against the workpiece rotating, so that a processing range is limited to a two-dimensional plane that can be easily formed automatically. For this reason, a lathe does not enable a bright surface to be formed on a three-dimensional surface such as that in a range from a top surface of a spoke to a side surface or an inner peripheral surface of a decorative window. Buffing is performed to polish a workpiece by pressing a buff against the workpiece while the workpiece or the buff is rotated, so that a buffing surface can be formed into a bright surface with high gloss when the surface is only polished. However, when clear coating is then applied to the surface, countless fine polishing marks appear to result in dull gloss due to characteristics of buffing. This does not enable the surface to be finished with high gloss like a mirror. On the other hand, while a design surface can be cut by using an end mill (multi-blade cutting tool) of a rotating tool with a machining center to form a bright surface, the end mill is configured to intermittently cut a material surface with a rotating multi-blade. Thus, a large number of cut traces are formed in a processed groove of the end mill in a direction intersecting a tool feed direction. This causes a large number of cutting traces to remain on a cutting surface formed with the end mill, so that the cutting surface cannot be formed with high gloss like a mirror.

The present invention has been made in view of the above circumstances, and an object thereof is to provide a method for producing vehicle wheels, capable of forming a specular glossy surface like a mirror, having a high metallic gloss property of a base metal on a three-dimensional shape surface of a design surface.

A method for producing vehicle wheels according to the present invention includes a step of forming a surface with a metallic gloss of a base metal appearing on a three-dimensional shape surface of a design surface, the step being performed in a state where a wheel body is fixed to be prevented from rotating around a rotation axis while a cutting edge of a cutting tool is in contact with the three-dimensional shape surface of the design surface in the wheel body, the cutting tool being three-dimensionally and continuously moved relatively along the three-dimensional shape surface while being changed in direction with respect to the three-dimensional shape surface to allow a rake face of the cutting tool to face a tool travel direction to perform three-dimensional continuous cutting processing that allows a specular glossy surface to be automatically formed in the three-dimensional shape surface, the specular glossy surface being finished into a processed surface having a high metallic gloss property by exposing the base metal.

Here, the three-dimensional continuous cutting processing is a method for performing cutting processing while a cutting tool (bite tool) is relatively moved three-dimensionally and continuously, the cutting tool being in contact with a three-dimensional shape surface. This method is different from lathe processing in which a cutting tool is brought into contact with a two-dimensional plane of a workpiece rotating using a lathe.

The specular glossy surface is a processed surface with no cutting trace remaining in a direction intersecting a tool feed direction in a processed groove scraped with a cutting tool. The specular glossy surface is different from a processed surface formed with innumerable polishing marks, such as a buffing surface, and a processed surface formed with a large number of cutting traces in a direction intersecting a tool feed direction in a processed groove, such as a processed surface finished by an end mill (rotary tool).

According to the present invention, a surface in a processed groove having been subjected to three-dimensional continuous cutting processing with a cutting tool can be finished into a smooth processed surface with no cutting trace remaining in a direction intersecting a tool feed direction. Accordingly, a processed surface having a high reflectance can be formed without requiring buffing. This processed surface becomes a specular glossy surface having a high reflectivity and a high metallic gloss property that cannot be obtained by buffing. In addition, this specular glossy surface can be continuously formed on a three-dimensional shape surface of a design surface that cannot be formed by lathe processing. Thus, even when the design surface being the three-dimensional shape surface is viewed from various directions, the specular glossy surface existing there appears to shine generally or partially like a mirror. As a result, a vehicle wheel that has a remarkably high metallic gloss appearance and is excellent in design properties can be provided.

DETAILED DESCRIPTION OF THE PREFERRED EMBODIMENT

Hereinafter, an embodiment of the present invention will be described.

Figure 1:
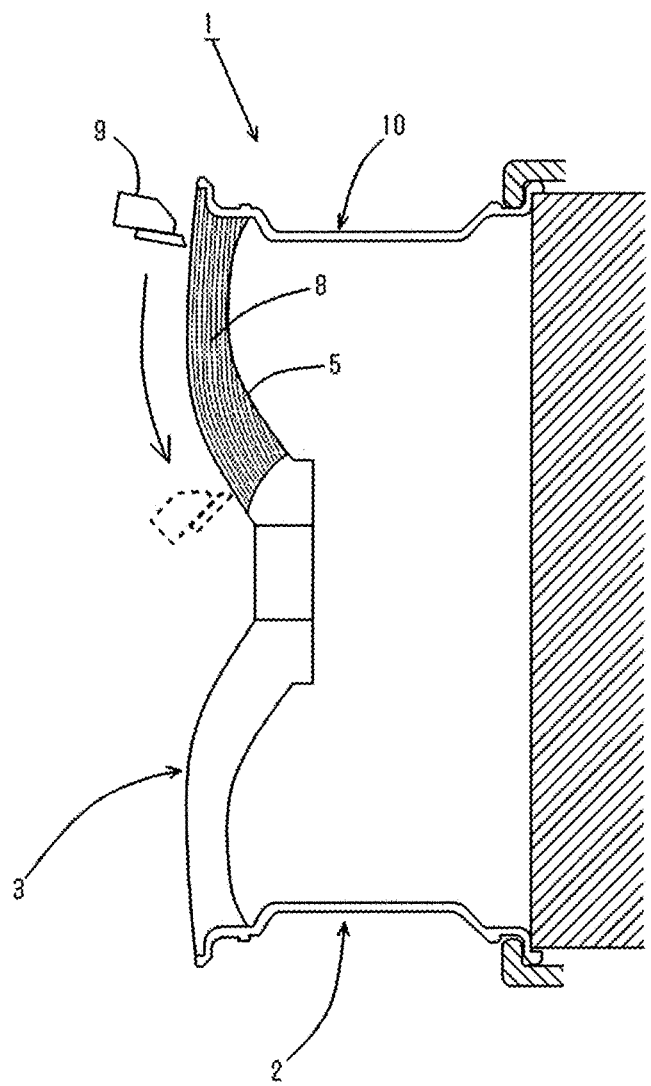
FIG. 1 is a schematic diagram for illustrating a method for forming a specular glossy surface on a three-dimensional shape surface of a design surface in an embodiment.

The present embodiment is a method for forming a specular glossy surface 8 like a mirror, having a high metallic gloss property, by exposing base metal to a three-dimensional shape surface of a design surface of a vehicle wheel 1. That is, the method (referred to as three-dimensional continuous cutting processing as appropriate) is for automatically forming the specular glossy surface 8 in the three-dimensional shape surface, the method being performed such that when the vehicle wheel 1 is manufactured, the three-dimensional shape surface of the design surface of the vehicle wheel 1 is cut with a cutting tool (bite tool) 9 using a processing machine while the cutting tool 9 is moved three-dimensionally and continuously relative to the three-dimensional shape surface, as shown in FIG. 1, to expose the base metal and finish the base metal into a mirror-like processed surface with a high metallic gloss property.

Figure 2:
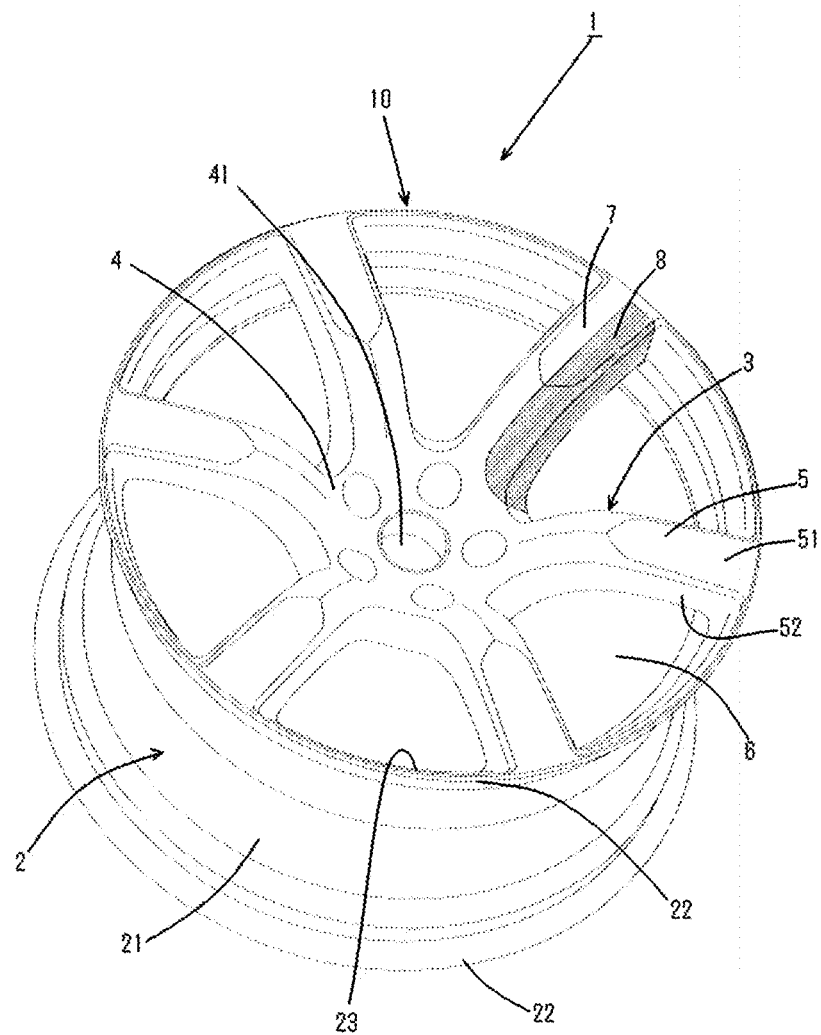
FIG. 2 is a perspective view illustrating a vehicle wheel provided with a specular glossy surface formed on a three-dimensional shape surface of a design surface by three-dimensional continuous cutting processing in an embodiment.

The vehicle wheel 1 manufactured by the present method is made of a light alloy such as an aluminum alloy, for example, and is formed of a wheel body 10 formed by casting or forging. As illustrated in FIG. 2, the vehicle wheel 1 is composed of a rim portion 2 and a disc portion 3. The method of the present invention can be applied regardless of material or the like of the vehicle wheel 1, and can be applied to any type in which the rim portion 2 and the disc portion 3 are integrated or divided.

The rim portion 2 includes a cylindrical portion 21 and rim flanges 22 (outer side and inner side) provided at opposite ends of the cylindrical portion 21. The disc portion 3 includes a hub mounting portion 4 having a hub hole 41 to be fitted with a vehicle hub, a plurality of spokes 5 extending from the hub mounting portion 4 to the rim portion 2, and a decorative hole 6 between the spokes 5. The vehicle wheel 1 includes the design surface that is the rim portion 2 and a front side surface 52 of the disc portion 3, and that is visible from the outside when the vehicle wheel 1 is mounted on a vehicle, the design surface including a top surface 51 and a side surface 52 of the spoke 5, and an inner peripheral surface 23 of the rim flange 22 on the outer side, and the like. The design surface has a three-dimensional shape, and has various three-dimensional shapes such as a rounded R shape, a rounded corner shape, a protruding shape, and a recessed shape.

The design surface of the vehicle wheel 1 has a colored surface 7 to which color coating of a base color is applied, and the specular glossy surface 8 on which a metallic gloss of the base metal appears. The colored surface 7 and the specular glossy surface 8 are each provided with a colorless or colored clear layer thereon. While the colored surface 7 has a layer structure in which a primer layer, a color coat layer of the base color, and a clear coat layer are formed in order on base metal of the wheel body 10, the colored surface 7 is not limited to this kind of layer structure and various layer structures are available. The specular glossy surface 8 is finished like a mirror by exposing the base metal with the three-dimensional continuous cutting processing of the present method after the color coat layer is formed or after the clear coat layer is formed on the color coat layer. The method of the present invention can also be applied to a design surface without the colored surface 7.

The specular glossy surface 8 is formed on the three-dimensional shape surface of the design surface. The three-dimensional shape surface has a three-dimensional shape, and is a surface having spatial expansion, including two adjacent surfaces, multiple surfaces, a curved surface, a spherical surface, a protruding surface, a recessed surface, a twisted surface, etc. The specular glossy surface 8 in the embodiment is formed in a three-dimensional shape surface continuous from the top surface 51 of the spoke to the side surface 52 of the spoke. Specifically, the top surface 51 of the spoke include a flat surface being substantially flat on its outer diameter side, an inclined surface on its inner diameter side, having a chevron shape and extending obliquely toward the center of the wheel. The specular glossy surface 8 is formed from a half rang of the top surface 51 of the spoke in the circumferential direction to the side surface 52 of the spoke. The specular glossy surface 8 is not limited to the position of the embodiment, and can be formed anywhere on the three-dimensional shape surface of the design surface. For example, the specular glossy surface 8 can be arbitrarily formed on a surface having a three-dimensional shape that cannot be formed by lathe processing, examples of the surface including the top surface 51 of the spoke having a protruding portion, a recessed portion, a stepped portion, etc., the side surface 52 of the spoke, an inner peripheral surface and the like of the decorative hole 6 having a curved portion, and a surface continuous with adjacent two surfaces of the top surface 51 of the spoke, the side surface 52 of the spoke, an inner peripheral surface of the rim portion 2, and the inner peripheral surface 23 of the rim flange 22.

Next, a method for forming the specular glossy surface 8 will be described.

As described above, the specular glossy surface 8 is formed by performing the three-dimensional continuous cutting processing using the cutting tool (bite tool) 9 with a processing machine.

The processing machine used in the present method has four or more processing axes each of which is moved with high precision under computer numerical control (CNC). As this processing machine, a four axes controllable processing machine provided with a fourth axis that can freely change in direction in C-direction (direction around an axis) on three straight traveling axes of XYZ, a five axes controllable processing machine provided with a fifth axis that can freely change in angle in B-direction (inclined direction of an axis) in addition to the four axes, or the like is available. Position control of four or more axes is performed relatively between a main shaft attached with the cutting tool 9 and a bed attached with the wheel body 10 as a workpiece. In addition, the processing machine moves each axis in an ultraprecise manner (e.g., accuracy in units of μm) under computer numerical control (CNC) based on three-dimensional shape data on a design surface. As such a processing machine, for example, a machining center improved in that a main shaft attached with a tool is firmly fixed at a predetermined position in a rotation direction without freely rotating may be available.

The cutting tool 9 used in the present method has an R-shaped cutting edge. The cutting edge preferably has an R radius equal to or less than a minimum R radius of a three-dimensional shape surface to be a processing range of a design surface. This facilitates performing continuous cutting processing by moving the R-shaped cutting edge of the cutting tool 9 faithfully along each of three-dimensional shape lines for various three-dimensional shape surfaces of the design surface while bringing it into contact with each of the three-dimensional shape lines, and also enables suppressing cutting resistance between the cutting edge and each of the three-dimensional shape surfaces to improve smoothness of a cutting surface. While the cutting edge of the cutting tool 9 is made of natural or artificial diamond suitable for mirror cutting, besides this, various materials such as cBN sintered body, ceramics, cermet, and cemented carbide are available.

When the specular glossy surface 8 is formed on the three-dimensional shape of the design surface of the vehicle wheel 1 by the processing machine, the wheel body 10 is attached to the bed of the processing machine, and the cutting tool 9 is attached to the main shaft. Although the wheel body 10 is formed with the colored surface 7 to be the basic color in the previous step, the wheel body 10 may not have the colored surface 7 in design. The processing machine features in that the cutting tool 9 is moved with respect to the wheel body 10 (work) fixed to the bed, according to a processing program allowing the cutting tool 9 to move along the design surface of the wheel body 10, unlike a normal machining center using a rotary tool. At this time, the wheel body 10 may be rotated together with the bed around their axes as a fourth axis within a predetermined processing range according to an angle command while a direction of the main shaft provided with the cutting tool 9 is fixed, or the main shaft provided with the cutting tool 9, serving as a fourth axis in addition to X/Y/Z axes, may be subjected to an angle command, without rotating the wheel body 10 and the bed. That is, this processing machine does not have an angle command unlike a general lathe, and is different in processing from that of moving a tool in two dimensions of X/Z axes while continuously rotating the wheel body 10. The processing machine also may be provided with an automatic tool changer (ATC), and the cutting tool 9 may be attached by automatic change. In this case, roughing of an outer shape of the wheel body 10 and drilling of the wheel body 10 can be performed with a normal rotary tool using the same processing machine, so that the vehicle wheel 1 can be manufactured efficiently and economically without using a plurality of machines.

Then, the processing machine is operated such that the cutting tool 9 is moved based on the three-dimensional shape data on the design surface in the wheel body 10 preliminarily input while being subjected to position control by computer numerical control (CNC) in an ultraprecise manner and cutting processing is performed to expose the base metal of the three-dimensional shape surface. At this time, three-dimensional continuous cutting processing is performed such that in a state where the cutting edge of the cutting tool 9 is in contact with the three-dimensional shape surface of the design surface in the wheel body 10, the cutting tool 9 is three-dimensionally and continuously moved relatively along the three-dimensional shape surface in a precise manner (e.g., accuracy in units of μm) while being changed in direction with respect to the three-dimensional shape surface to allow a rake face of the cutting tool 9 to face a tool feed direction. During this three-dimensional continuous cutting processing, the cutting tool 9 is controlled in position to be moved along the three-dimensional shape surface by positioning the cutting edge to follow continuously three-dimensional shapes such as uneven surface of the three-dimensional shape surface and a salient angle between two adjacent surfaces in the three-dimensional shape surface. The cutting tool 9 is also controlled in position to allow its rake face to face the tool feed direction by continuously matching a direction of the rake face to a direction of a processing line while the rake face is held within a predetermined range with respect to the three-dimensional shape surface.

This three-dimensional continuous cutting processing allows the cutting tool 9 to be moved in an identical direction at an identical pitch within a processing range of the three-dimensional shape surface of the design surface to form a linear shallow processed groove 81 one by one according to a movement locus of the cutting tool 9. Accordingly, a plurality of the processed grooves 81 is formed extending in an identical direction in parallel with each other at equal intervals in a precise manner according to movement loci of the cutting tool 9 within the processing range of the three-dimensional shape surface, and the specular glossy surface 8 where the base metal is exposed is automatically formed.

Figure 3A:
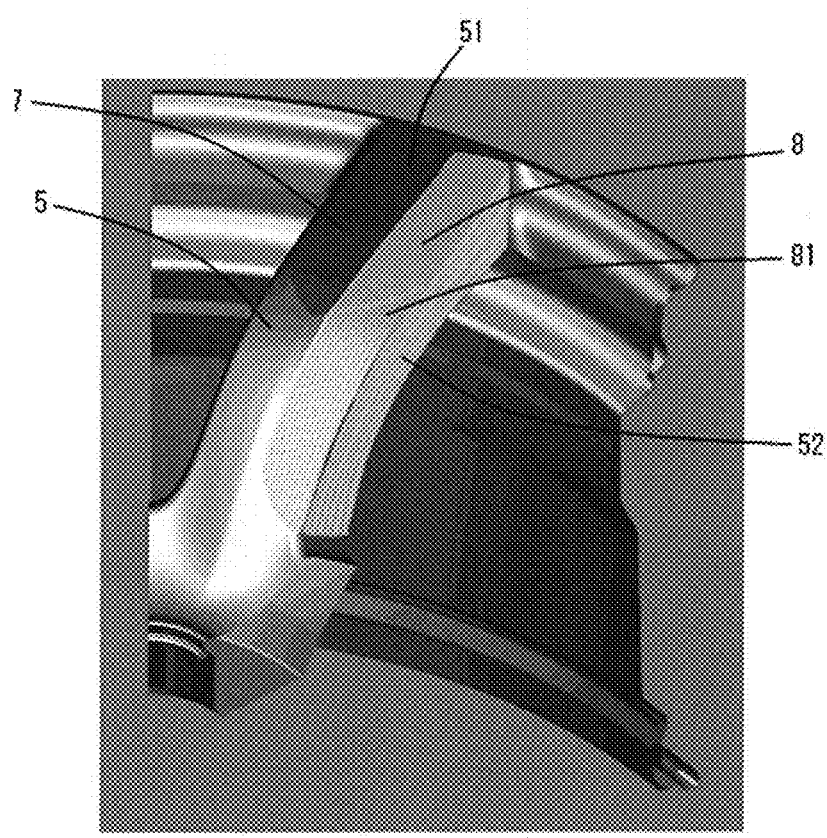
FIG. 3A is a perspective view of a spoke portion, schematically illustrating a specular glossy surface formed on the spoke, shows a vertical-striped pattern as an array pattern of a plurality of processed grooves forming the specular glossy surface.
Figure 3B:
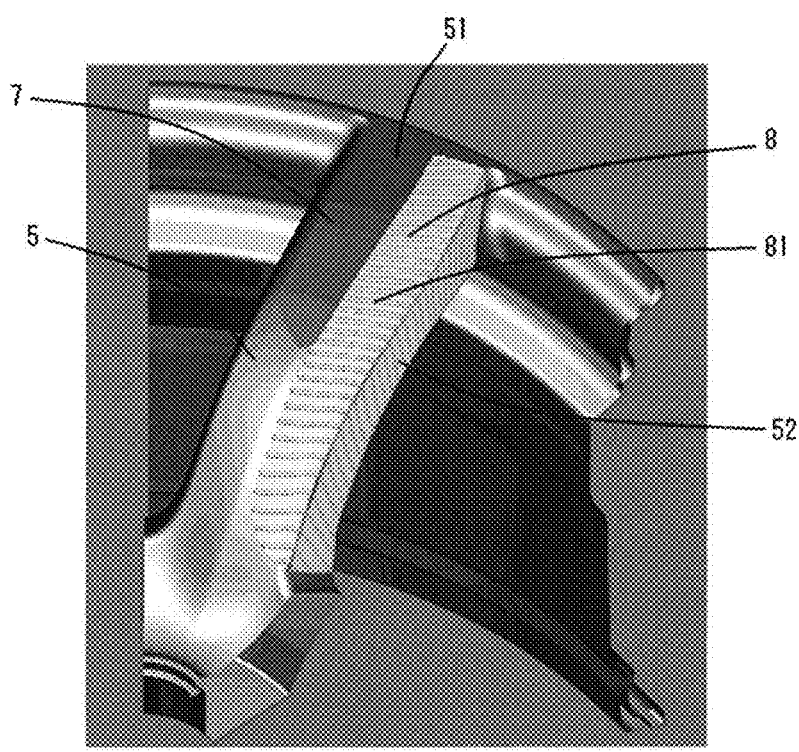
FIG. 3B is a perspective view of a spoke portion, schematically illustrating a specular glossy surface formed on the spoke, shows a horizontal-striped pattern as an array pattern of a plurality of processed grooves forming the specular glossy surface.

As described above, the specular glossy surface 8 includes the plurality of shallow processed grooves 81 that extends in the identical direction while being arrayed in parallel with each other at equal intervals in a precise manner. The plurality of processed grooves 81 may form various array patterns such as a vertical-striped pattern extending in the radial direction of the disc portion 3 (refer to FIG. 3A), a horizontal-striped pattern extending in the circumferential direction of the disc portion 3 (refer to FIG. 3B), and an oblique-striped (not illustrated) extending in an oblique direction. In addition, the interval between the processed grooves 81 can be arbitrarily set.

After the specular glossy surface 8 is formed, colorless or colored clear paint is applied to the entire design surface to protect or cover the colored surface 7 and the specular glossy surface 8 to form a colorless transparent or colored transparent clear layer. Accordingly, the vehicle wheel 1 formed with the colored surface 7 and the specular glossy surface 8 on the three-dimensional shape surface of the design surface is manufactured.

According to the method for forming the specular glossy surface 8 described above, a surface in the processed groove 81 having been subjected to the three-dimensional continuous cutting processing with the cutting tool 9 can be finished into a smooth processed surface with no cutting trace remaining in a direction intersecting a tool feed direction, and thus a processed surface having high reflectance can be formed without requiring buffing. The specular glossy surface 8 formed of this processed surface has a high reflectivity and a high metallic gloss property that cannot be obtained by buffing, and thus becomes a mirror-like surface. In addition, this specular glossy surface 8 can be continuously formed on a three-dimensional shape surface of a design surface that cannot be formed by lathe processing. Thus, even when the design surface being the three-dimensional shape surface is viewed from various directions, the specular glossy surface 8 existing there appears to shine generally or partially like a mirror. As a result, the vehicle wheel 1 that has a remarkably high metallic gloss appearance and is excellent in design properties can be provided.

In addition, the specular glossy surface 8 is a processed surface including the plurality of shallow processed grooves 81 extending in the identical direction while being arrayed in parallel with each other at equal intervals in a precise manner (e.g., in units of μm), so that a high metallic gloss can appear even when the specular glossy surface 8 having the three-dimensional shape is viewed from any direction. That is, at a place where the processed groove 81 is curved in its lengthwise direction on the three-dimensional shape surface, light can be reflected also in the lengthwise direction of the processed groove 81, and at a place where a plurality of the processed grooves 81 is arrayed in a direction in which the three-dimensional shape surface is curved, light can be reflected along an array direction of the processed grooves 81. Accordingly, a range in which the specular glossy surface 8 appears shining can be widened.

The plurality of processed grooves 81 is arrayed in parallel with each other at equal intervals, so that decrease in the interval between the processed grooves 81 enables decrease in height (e.g., an average height of 1 μm or less) of processed locus lines (side walls remaining in both width sides of the processed groove 81) extending in the lengthwise direction of the processed grooves 81. This causes decrease in surface roughness to enable further increase in reflectance, so that a specular degree of the specular glossy surface 8 can be further improved. Even when the interval between the processed grooves 81 is not narrowed, forming the processed groove 81 as shallow as possible enables decrease in height (e.g., an average height of 1 μm or less) of the processed locus line formed in the processed groove 81. This enables the surface roughness to be reduced to further increase the reflectance.

To verify effects described above, a processed surface (specular glossy surface 8) acquired by the three-dimensional continuous cutting processing of the method of the present invention, and in contrast to this, a polished surface by buffing and a processed surface with a ball end mill, were observed by being magnified by 50 times.

Figure 4A:
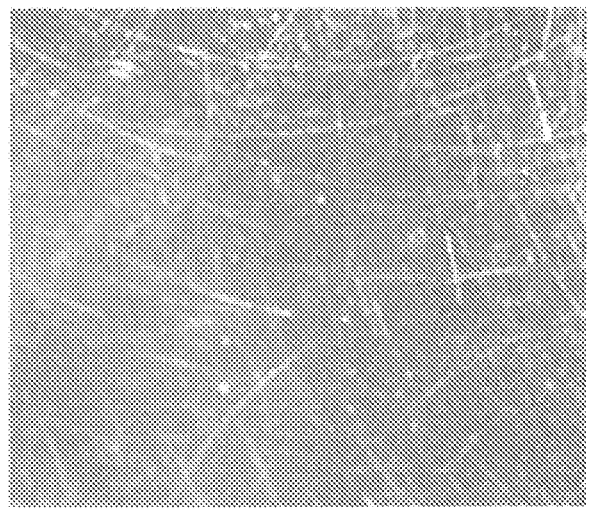
FIG. 4A is an enlarged photograph of an exposed metal portion formed on a design surface, shows a processed surface polished by buffing.
Figure 4B:
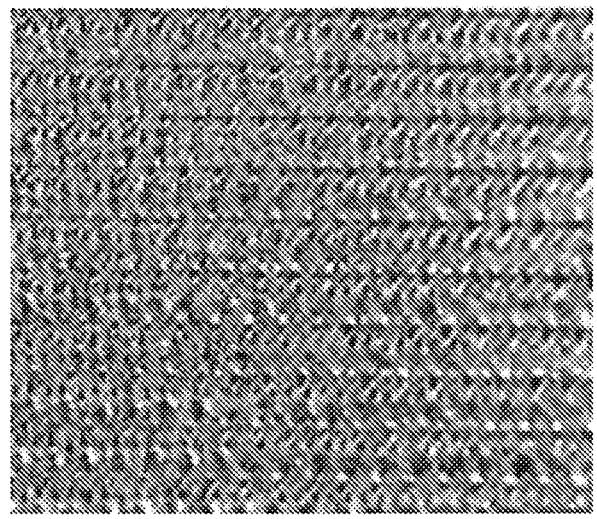
FIG. 4B is an enlarged photograph of an exposed metal portion formed on a design surface, shows a processed surface formed with a double blade ball end mill.
Figure 4C:
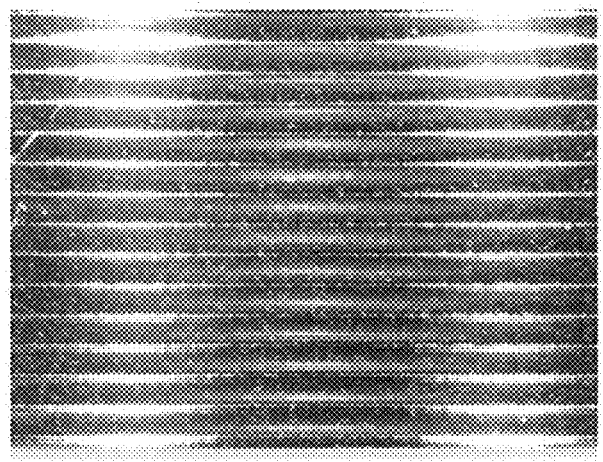
FIG. 4C is an enlarged photograph of an exposed metal portion formed on a design surface, shows a processed surface (specular glossy surface) formed by three-dimensional continuous cutting processing of a method of the present invention.

As shown in the enlarged photograph of FIG. 4A, the polished surface by buffing has numerous polishing marks in random directions due to rotation of a buff, and is a surface that is generally white and cloudy, and is inferior in gloss. As shown in the enlarged photograph of FIG. 4B, the processed surface with a double blade ball end mill includes a large number of cutting traces due to a multi-rotary blade that are formed in a direction intersecting a tool feed direction in a large number of processed grooves formed with the ball end mill, the processed surface being generally white and inferior in gloss. In contrast, as shown in the enlarged photograph of FIG. 4C, the processed surface acquired by the three-dimensional continuous cutting processing of the method of the present invention includes a large number of processed grooves 81 formed by the cutting tool 9, in which no cutting trace remains in a direction intersecting a tool feed direction, and the processed surface is finished smoothly. Thus, it is verified that the processed surface shines like a mirror as a whole and has excellent gloss.

In addition, a regular reflectance (at an incident angle of 60°) of the specular glossy surface 8 on the top surface 51 of the spoke, subjected to the three-dimensional continuous cutting processing of the method of the present invention, was measured with the measuring machine (high-gloss checker IG-410 available from HORIBA, Ltd.) by forming a clear layer on the specular glossy surface 8 while changing its thickness when no clear layer was painted thereon. In contrast, a regular reflectance (at an incident angle of 60°) of a bright surface on a top surface of a spoke of a commercial product (FUCHS vehicle wheel equipped in the BMW M5 and M6 series) with a clear layer formed after buffing was also measured with the measuring machine above.

As a result, the regular reflectance of the commercial product (buffing+clear layer) was 39.1%. In contrast, the specular glossy surface 8 according to the method of the present invention, with no clear paint, had a regular reflectance of 73.6%, and the specular glossy surfaces 8 formed with clear layers having thicknesses of 20±5 μm, 35±5 μm, and 45±5 μm, had regular reflectances of 69.0%, 68.9%, and 70.6%, respectively, which were higher than that of the commercial product. Accordingly, the specular glossy surface 8 according to the method of the present invention had a regular reflectance of 68% or more even when a clear layer was formed thereon, the regular reflectance being much higher than that of the commercial product formed with a clear layer after buffing, and it is verified that the specular glossy surface 8 had a high metallic gloss property like a mirror. It is also verified that the specular glossy surface 8 according to the method of the present invention can still maintain a high metallic gloss property like a mirror even when a clear layer is formed thereon, without causing a significant decrease in regular reflectance as compared with the case with no clear paint.

In addition, the present invention is not limited to the embodiment, and various changes can be made within the description in the scope of claims and a range equivalent to the scope.

What is claimed is:

1. A method for producing vehicle wheels, the method comprising:
    fixing a wheel body to prevent the wheel body from rotating around a rotation axis while a cutting edge of a cutting tool is in contact with a three-dimensional shape surface of a design surface of the wheel body; and
    three-dimensionally and continuously moving the cutting tool along the three-dimensional shape surface while being changed in direction with respect to the three-dimensional shape surface to allow a rake face of the cutting tool to face a tool travel direction to perform three-dimensional continuous cutting processing,
    wherein the cutting tool causes a specular glossy surface to be formed in the three-dimensional shape surface,
    wherein moving the cutting tool causes the specular glossy surface to be finished into a processed surface having a high metallic gloss property by exposing base metal of the wheel body from a coating layer previously disposed on the wheel body,
    wherein the specular glossy surface has a regular reflectance of 68% or more at an incident angle of 60°, and
    wherein an average height of processed grooves in the processed surface is not more than 1 μm.

2. The method for producing vehicle wheels according to claim 1, wherein the cutting tool has a cutting edge, and the cutting edge has a radius equal to or less than a minimum radius of the three-dimensional shape surface.

3. The method for producing vehicle wheels according to claim 2, wherein
a processing machine used for the three-dimensional continuous cutting processing is capable of axis control of four or more axes, and is capable of computer numerical control based on three-dimensional shape data of the three-dimensional shape surface.

4. The method for producing vehicle wheels according to claim 2, further comprising:
applying colorless clear paint or colored clear paint to the specular glossy surface after the specular glossy surface is formed.

5. The method for producing vehicle wheels according to claim 2,
wherein the specular glossy surface is continuously formed on at least two adjacent surfaces of the design surface, and
wherein the design surface comprises a top surface of a spoke, a side surface of the spoke, an inner peripheral surface of a rim portion, and an inner peripheral surface of a rim flange.

6. The method for producing vehicle wheels according to claim 2, wherein
the design surface includes a twist surface formed by twisting a top surface of a spoke to one of side surface sides, and the specular glossy surface is formed on the twist surface.

7. The method for producing vehicle wheels according to claim 2, wherein
the specular glossy surface is formed on a part of a colored surface that is color-coated.

8. The method for producing vehicle wheels according to claim 1, wherein
a processing machine used for the three-dimensional continuous cutting processing is capable of axis control of four or more axes, and is capable of computer numerical control based on three-dimensional shape data of the three-dimensional shape surface.

9. The method for producing vehicle wheels according to claim 1, further comprising:
applying colorless clear paint or colored clear paint to the specular glossy surface after the specular glossy surface is formed.

10. The method for producing vehicle wheels according to claim 1,
wherein the specular glossy surface is continuously formed on at least two adjacent surfaces of the design surface, and
wherein the design surface comprises a top surface of a spoke, a side surface of the spoke, an inner peripheral surface of a rim portion, and an inner peripheral surface of a rim flange.

11. The method for producing vehicle wheels according to claim 1, wherein
the design surface includes a twist surface formed by twisting a top surface of a spoke to one of side surface sides, and the specular glossy surface is formed on the twist surface.

12. The method for producing vehicle wheels according to claim 1, wherein
the specular glossy surface is formed on a part of a colored surface that is color-coated.

* * * * *